United States Patent
Sachs et al.

(10) Patent No.: US 10,104,520 B2
(45) Date of Patent: Oct. 16, 2018

(54) METHOD AND NODES FOR SELECTING A CAPILLARY NETWORK GATEWAY

(71) Applicant: Telefonaktiebolaget LM Ericsson (publ), Stockholm (SE)

(72) Inventors: Joachim Sachs, Sollentuna (SE); Ari Keränen, Helsinki (FI); Johan Rune, Lidingö (SE); Anders E. Eriksson, Kista (SE); Nicklas Beijar, Kirkkonummi (FI); Vlasios Tsiatsis, Solna (SE); Francesco Militano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/116,931

(22) PCT Filed: Feb. 21, 2014

(86) PCT No.: PCT/SE2014/050216
§ 371 (c)(1),
(2) Date: Aug. 5, 2016

(87) PCT Pub. No.: WO2015/126296
PCT Pub. Date: Aug. 27, 2015

(65) Prior Publication Data
US 2016/0353227 A1  Dec. 1, 2016

(51) Int. Cl.
*H04W 4/70* (2018.01)
*H04W 48/18* (2009.01)
(Continued)

(52) U.S. Cl.
CPC .............. *H04W 4/70* (2018.02); *H04L 51/38* (2013.01); *H04W 48/18* (2013.01);
(Continued)

(58) Field of Classification Search
None
See application file for complete search history.

(56) References Cited

U.S. PATENT DOCUMENTS 9,338,070 B2 * 5/2016 Singh .................. H04L 43/08
9,730,176 B2  8/2017 Starsinic et al.
(Continued)

FOREIGN PATENT DOCUMENTS

EP  2306766 A1  4/2011
EP  2309790 A2  4/2011
(Continued)

OTHER PUBLICATIONS

Author Unknown, "Machine-to-Machine communications (M2M); Functional architecture," Draft, Technical Specification 102 690, Version <0.9.6>, European Telecommunications Standards Institute, Dec. 2010, 191 pages.
(Continued)

*Primary Examiner* — Bunjob Jaroenchonwanit
(74) *Attorney, Agent, or Firm* — Withrow & Terranova, PLLC (57) ABSTRACT

The disclosure relates to a method for selecting a capillary network gateway for a machine device of a capillary network. The capillary network gateway is capable of data exchange between the machine device and a wireless network. The method comprises: acquiring information about a respective message box capability for two or more capillary network gateways of the capillary network; and selecting, for the machine device, the capillary network gateway based on the information about the message box capability. The disclosure also relates to a corresponding node, computer program and computer program product.

25 Claims, 4 Drawing Sheets

(51) Int. Cl.
*H04L 12/58* (2006.01)
*H04W 52/02* (2009.01)
*H04W 88/18* (2009.01)
*H04W 4/12* (2009.01)
*H04W 88/16* (2009.01)

(52) U.S. Cl.
CPC ... *H04W 52/0209* (2013.01); *H04W 52/0216* (2013.01); *H04W 52/0219* (2013.01); *H04W 4/12* (2013.01); *H04W 88/16* (2013.01); *H04W 88/182* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/21* (2018.01)

(56) References Cited

U.S. PATENT DOCUMENTS

| | | | |
|---|---|---|---|
| 9,820,189 | B2* | 11/2017 | Novo Diaz ......... H04W 28/085 |
| 2007/0047561 | A1* | 3/2007 | Chen ................... H04L 67/06 370/401 |
| 2008/0019313 | A1 | 1/2008 | Vogety |
| 2009/0041039 | A1 | 2/2009 | Bear et al. |
| 2009/0175204 | A1 | 7/2009 | Kim |
| 2011/0081903 | A1* | 4/2011 | Cai ................... H04W 36/0055 455/424 |
| 2011/0228750 | A1 | 9/2011 | Tomici et al. |
| 2012/0113971 | A1 | 5/2012 | Giaretta et al. |
| 2012/0128090 | A1 | 5/2012 | Seok |
| 2012/0287854 | A1 | 11/2012 | Xie et al. |
| 2013/0070775 | A1 | 3/2013 | Qu |
| 2013/0142059 | A1 | 6/2013 | Di Girolamo et al. |
| 2013/0155948 | A1 | 6/2013 | Pinheiro et al. |
| 2013/0188515 | A1* | 7/2013 | Pinheiro ............... H04W 4/001 370/254 |
| 2013/0203412 | A1 | 8/2013 | Starsinic et al. |
| 2013/0311640 | A1* | 11/2013 | Gleixner ............. H04W 40/246 709/224 |
| 2013/0322329 | A1 | 12/2013 | Visuri et al. |
| 2014/0016466 | A1* | 1/2014 | Calvanese Strinati ................... H04W 28/14 370/235 |
| 2014/0064232 | A1 | 3/2014 | Chang et al. |
| 2014/0112301 | A1 | 4/2014 | Shu et al. |
| 2014/0129672 | A1 | 5/2014 | Singh |
| 2014/0167929 | A1 | 6/2014 | Shim et al. |
| 2014/0328254 | A1 | 11/2014 | Lim |
| 2015/0050954 | A1* | 2/2015 | Kameno ............... H04W 48/18 455/509 |
| 2015/0256349 | A1 | 9/2015 | Kim et al. |
| 2015/0264668 | A1 | 9/2015 | Takehana et al. |
| 2016/0065472 | A1* | 3/2016 | Gleixner ............. H04W 40/246 370/254 |
| 2016/0283191 | A1* | 9/2016 | Lu ..................... G06F 17/30752 |
| 2016/0353228 | A1* | 12/2016 | Sachs ................... H04W 4/008 |
| 2016/0353326 | A1* | 12/2016 | Novo Diaz ......... H04W 28/085 |
| 2017/0013059 | A1* | 1/2017 | Keranen ............... H04W 4/005 |
| 2017/0048792 | A1* | 2/2017 | Sachs ................... H04W 48/18 |
| 2017/0055310 | A1* | 2/2017 | Sachs ................... H04W 4/005 |
| 2017/0071024 | A1* | 3/2017 | Sachs ................... H04W 4/005 |
| 2017/0085490 | A1* | 3/2017 | Sachs ................... H04W 4/005 |
| 2017/0171806 | A1* | 6/2017 | Sachs ................... H04W 48/20 |
| 2017/0303177 | A1* | 10/2017 | Ngounou ............. H04W 36/22 |
| 2017/0311304 | A1* | 10/2017 | Lu ..................... H04W 72/0406 |

FOREIGN PATENT DOCUMENTS

| | | |
|---|---|---|
| WO | 2011112683 A1 | 9/2011 |
| WO | 2012136005 A1 | 10/2012 |
| WO | 2013157577 A1 | 10/2013 |
| WO | 2015126294 A1 | 8/2015 |
| WO | 2015126295 A1 | 8/2015 |

OTHER PUBLICATIONS

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.

Author Unknown, "Technical Specification Group Services and System Aspects; Generic Authentication Architecture (GAA); Generic Bootstrapping Architecture (GBA) (Release 12)," Technical Specification 33.220, Version 12.0.0, 3GPP Organizational Partners, Mar. 2013, 92 pages.

International Search Report and Written Opinion for International Patent Application No. PCT/SE2014/050215, dated Feb. 5, 2015, 16 pages.

International Search Report and Written Opinion for International Patent Application No. PCT/SE2014/050216, dated Feb. 3, 2015, 10 pages.

International Search Report and Written Opinion for International Patent Application No. PCT/SE2014/050214, dated Dec. 17, 2014, 11 pages.

Non-Final Office Action for U.S. Appl. No. 15/116,962, dated Jan. 4, 2018, 9 pages.

Final Office Action for U.S. Appl. No. 15/116,899, dated Feb. 7, 2018, 18 pages.

Non-Final Office Action for U.S. Appl. No. 15/116,899, dated Oct. 3, 2017, 18 pages.

Kim et al., "Effective M2M gateway selection algorithms for geographical region-based query," Information and Communication Technology Convergence (ICTC), 2010 International Conference, Nov. 17-19, 2010, Jeju, South Korea, IEEE, pp. 413-414.

Beijar, N., et al., "Gateway Selection in Capillary Networks," 2015 5th International Conference on the Internet of Things (IoT), Oct. 26-28, 2015, Seoul, South Korea, 8 pages.

Advisory Action for U.S. Appl. No. 15/116,899, dated Apr. 23, 2018, 3 pages.

Notice of Allowance for U.S. Appl. No. 15/116,899, dated Jun. 11, 2018, 9 pages.

Final Office Action for U.S. Appl. No. 15/116,962, dated May 4, 2018, 12 pages.

* cited by examiner

M ETHOD AND NODES FOR SELECTING A
CAPILLARY NETWORK GATEWAY

This application is a 35 U.S.C. § 371 national phase filing of International Application No. PCT/SE2014/050216, filed Feb. 21, 2014, disclosure of which is incorporated herein by reference in its entirety.

TECHNICAL FIELD

The technology disclosed herein relates generally to the field of capillary networks, and in particular to selection of a capillary network gateway in such capillary network.

BACKGROUND

A currently foreseen development of communication in cellular networks involves numerous small autonomous devices, which transmit and receive only small amounts of data (or are polled for data) occasionally, e.g. once a week to once per minute. These devices may be sensors or actuators of different kinds, which communicate with application servers within or outside a cellular network. The application servers configure the devices and receive data from them. Hence, this type of communication is often referred to as machine-to-machine (M2M) communication and the devices may be denoted machine devices (MDs). In the 3GPP standardization such devices may be denoted Machine Type Communication devices (MTC devices). In the following, such autonomous device is denoted machine device (MD).

So far focus has been directed to MDs being directly connected to the cellular network via the radio interface of the cellular network. However, a scenario which is likely to be more prevalent is that MDs connect to the cellular network via a gateway. In such scenarios the gateway acts like a UE towards the cellular network while maintaining a local network, typically based on a short range radio technology towards the MDs. Such a local network, which in a sense extends the reach of the cellular network (to other radio technologies but not necessarily in terms of radio coverage), has been coined capillary network and the gateway connecting the capillary network to the cellular network is herein referred to as a capillary network gateway (CGW).

Figure 1:
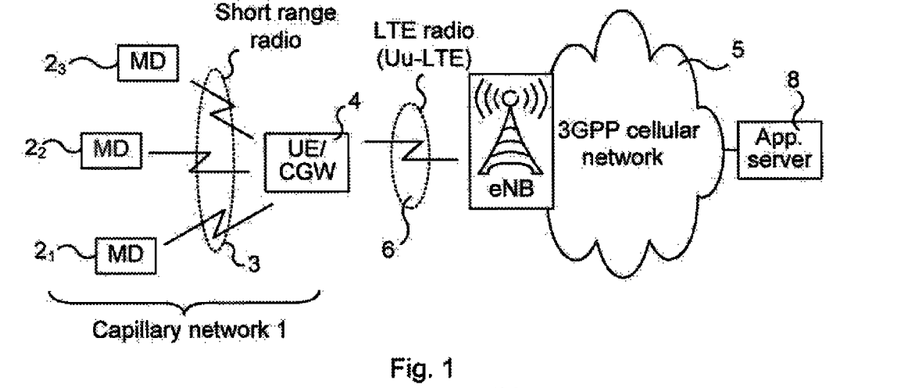
FIG. 1 illustrates schematically a capillary network and a wireless network.

FIG. 1 illustrates such capillary network 1, comprising a number of MDs $2_1$, $2_2$, $2_3$. The MDs $2_1$, $2_2$, $2_3$ are communicating with the CGW 4 over a first air interface 3 typically implementing a short range radio technology. The CGW 4 is in turn communicating with a node of the cellular network 5 over a second air interface 6. An application server 8 is also illustrated.

SUMMARY

Selection of CGW in cases where a MD can access multiple CGWs is an aspect for which satisfactory control mechanisms are lacking. Presently, the MDs use some kind of channel quality measure or link metric as basis for the CGW selection, but other selection mechanisms may be desired.

In view of the nature of MD devices and their assumed typical uses it follows that they will often have to be very energy efficient, as external power supplies will typically not be available and since it is neither practically nor economically feasible to frequently replace or recharge their batteries. In some scenarios the MD devices may not even be battery powered, but may instead rely on energy harvesting, i.e. gathering energy from the environment, opportunistically utilizing (the often very limited) energy that may be tapped from sun light, temperature gradients, vibrations, etc.

The various MDs of a capillary network may thus have different prerequisites concerning amount of power available to them, and may therefore have different requirements for energy efficient operation. The MDs may also have different strategies for accomplishing this energy efficient operation, one strategy e.g. being entering a low-power mode, also known as sleep mode.

The presently used mechanisms do not take into account e.g. such specific requirements of the MDs, and a selection mechanism indeed considering the energy efficiency of the MDs may be desirable in some cases.

Other selection mechanisms may be desirable also from the point of view of the cellular network operator, e.g. for enabling best use of available resources while at the same time providing best possible service to their customers.

An object of the present teachings is to solve or at least alleviate at least one of the above mentioned problems.

The object is according to a first aspect achieved by a method for selecting a capillary network gateway for a machine device of a capillary network. The capillary network gateway is capable of data exchange between the machine device and a wireless network. The method comprises: acquiring information about a respective message box capability for two or more capillary network gateways of the capillary network, and selecting, for the machine device, the capillary network gateway based on the information about the message box capability.

The method provides an improved choice of capillary network gateway by taking into account additional information when making a decision about which capillary network gateway to select for a machine device. The method further enables the operator of the wireless network to have some control of the machine device's choice of capillary network gateway, in particular enabling steering machine devices to capillary network gateways with appropriate message box capabilities. The machine device is enabled to use a capillary network gateway having a message box capability, and may provide its data thereto and receive instructions therefrom with a reduced connectivity time compared to communicating with an application server higher up in the network. The machine device may thereby be in a power saving mode for a longer duration, compared to the link metrics conventionally used for selecting a capillary network gateway, and prolonged operational time is provided.

The object is according to a second aspect achieved by a node for selecting a capillary network gateway for a machine device of a capillary network. The capillary network gateway is capable of data exchange between the machine device and a wireless network. The node comprises a processor and memory, the memory containing instructions executable by the processor, whereby the node is operative to: acquire information about a respective message box capability for two or more capillary network gateways of the capillary network, and select, for the machine device 11, the capillary network gateway based on the information about message box capability.

The object is according to a third aspect achieved by a computer program for a node for selecting a capillary network gateway for a machine device of a capillary network. The capillary network gateway is capable of data exchange between the machine device and a wireless network. The computer program comprises computer program code, which, when run on the node causes the node to: acquire information about a respective message box capability for two or more capillary network gateways of the capillary network, and select, for the machine device, the capillary network gateway based on the information about the message box capability.

The object is according to a fourth aspect achieved by a computer program product comprising a computer program as above, and a computer readable means on which the computer program is stored.

The object is according to a fifth aspect achieved by a node for selecting a capillary network gateway for a machine device of a capillary network, the capillary network gateway being capable of data exchange between the machine device and a wireless network. The node comprises: means for acquiring information about a respective message box capability for two or more capillary network gateways of the capillary network, and means for selecting, for the machine device, the capillary network gateway based on the information about the message box capability.

Further features and advantages of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, in an aspect, the present disclosure describes methods and devices for selecting a proper CGW for a MD that reduces the energy consumption of the MD; in particular a CGW that has a message box capability may be selected by the MD with scarce energy resources. Thus, instead of communicating with a default message box higher up in the network (e.g. a mirror functionality server), a particular MD may select a CGW having the corresponding capability. The CGW is closer to the MD than such default message box, thereby having e.g. a shorter round trip time (RTT). A reduced connectivity time is thereby enabled and hence reduced energy consumption, both during the actual communication exchange and also by the MD returning to a low-power mode (also denoted sleep mode) faster, thus being in such low-power mode for longer durations.

Figure 2:
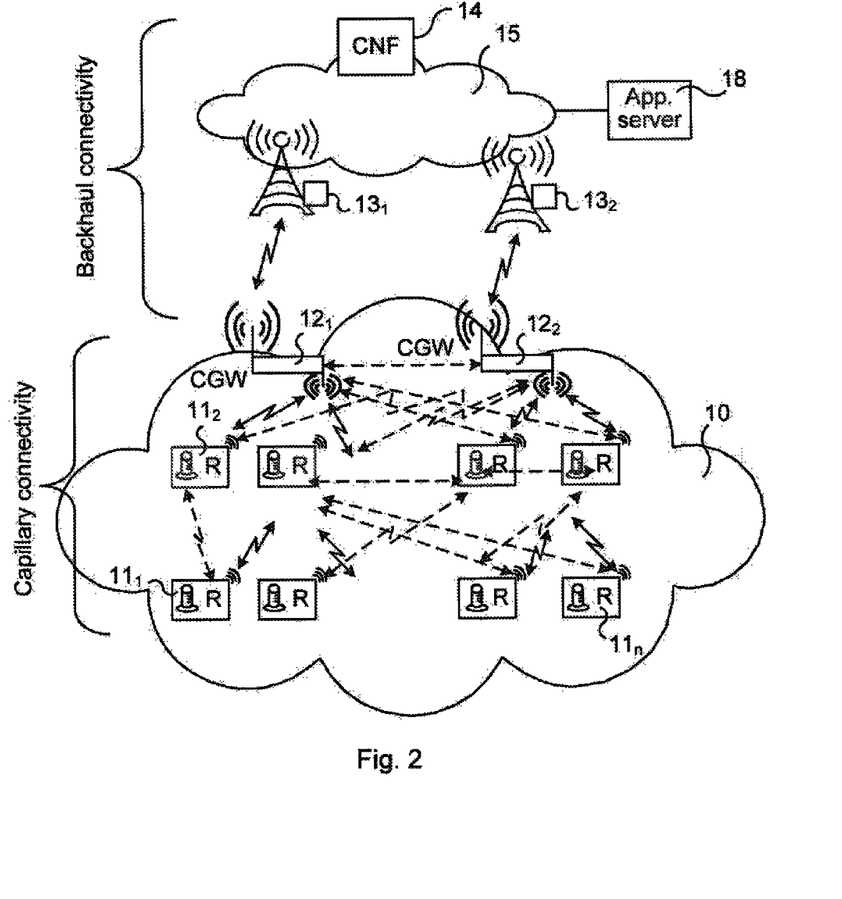
FIGS. 2 and 3 illustrate environments in which embodiments of the present disclosure may be implemented.

FIG. 2 illustrates an environment in which embodiments of the present disclosure may be implemented. It is initially noted that embodiments of the present disclosure are described and exemplified by using LTE as the radio access technology over the air interface between the CGW and the cellular network (also denoted wireless network in the following). The teachings of the present disclosure may however be applied also to other radio access technologies, such as e.g. Global System for Mobile Communications (GSM) or Universal Mobile Telecommunications System (UMTS).

A capillary network 10 comprises one or more machine devices (MDs) $12_1$, $12_2$, and one or more capillary network gateways (CGWs) $12_1$, $12_2$. The MDs $11_1$, $11_2$, ..., $11_n$ are capable to (e.g. configured to) communicate with the CGW $12_1$, $12_2$, and/or with other MDs $11_1$, $11_2$, ..., $11_n$ over a first air interface. The first air interface may implement a short range radio technology, such as for example IEEE 802.15.4 (e.g. with 6LoWPAN or ZigBee as the higher layers), Bluetooth Low Energy or low energy versions of the IEEE 802.11 family, (i.e. Wireless Local Area Networks, or WiFi). In FIG. 2, the communication over this first air interface is illustrated by the various arrows between the MDs $11_1$, $11_2$, ..., $11_n$ and between the MDs $11_1$, $11_2$, ..., $11_n$ and the CGWs $12_1$, $12_2$. The MDs $11_1$, $11_2$, ..., $11_n$ may for example comprise metering devices, actuators or sensors, e.g. electricity meters.

The CGWs $12_1$, $12_2$ are in turn capable to (e.g. configured to) communicate not only with the MDs $11_1$, $11_2$, ..., $11_n$ but also with a node $13_1$, $13_2$ of a wireless network 15 (cellular network) over a second air interface. When the wireless network 15 is an LTE network, the node may e.g. be an evolved node B (eNB), and the second air interface is then the LTE-Uu-interface. This communication over the second air interface is illustrated by the arrows between the CGWs $12_1$, $12_2$ and the nodes $13_1$, $13_2$ of the wireless network 15. The CGWs $12_1$, $12_2$ are thus interfacing both the MDs $11_1$, $11_2$, ..., $11_n$ and the wireless network 15. The wireless network 15 may comprise an LTE network, but may alternatively be another type of network, as mentioned earlier.

For the purposes of the present disclosure, the CGWs $12_1$, $12_2$ may generally, but not necessarily, be under the control of an operator of the wireless network 15 even though the operator of the wireless network 15 does not necessarily own the CGWs $12_1$, $12_2$.

The capillary network 10 may be single hop network (refer to FIG. 3, which illustrates such case), i.e. all MDs $11_1$, $11_2$, ..., $11_n$ have a direct link to the CGW $12_1$, $12_2$. This is the case e.g. for a WiFi network with the CGWs $12_1$, $12_2$ acting as the access point towards the wireless network 15. The capillary network 10 may else, as illustrated in the FIG. 2, be a multi-hop network, i.e. some MDs $11_1$, $11_2$, ..., $11_n$ may have to communicate via one or more other MD(s) $11_1$, $11_2$, ..., $11_n$ to reach the CGW $12_1$, $12_2$. This is often the case e.g. for an IEEE 802.15.4+ZigBee network with the CGW $12_1$, $12_2$ acting as a Personal Area Network (PAN) controller. Aspects of the present disclosure are applicable to both such set-ups of the capillary network 10. In the multi-hop case, a routing protocol, such as Routing Protocol for Low-Power and Lossy Networks (RPL), may be used. It is noted that the RPL may, in principle, be used also in single hop networks, although there is typically no need for a routing protocol in such networks.

An application server 18 is also illustrated in FIG. 2. The application server 18 may be part of the wireless network 15, or be part of another network connected to the wireless network 15. Such other network may e.g. comprise a third party service provider's network (e.g. owned by a service provider other than the operator of the wireless network 15). The application server 18 comprises applications which may configure the MDs $11_1$, $11_2$, ..., $11_n$ to e.g. perform a certain action such as perform a reading and send a reading value to it.

According to an aspect of the present disclosure, a Capillary Network Function (CNF) is introduced, illustrated schematically at reference numeral 14. A function of the CNF 14 is to select a CGW $12_1$, $12_2$ for an MD 11, which selection will be described further with reference to FIG. 3. It is noted that although illustrated in the FIG. 3 as located in the wireless network 15, the selection functionality of the CNF 14 may alternatively be implemented in a node of the capillary network 10. In embodiments of the present disclosure wherein the CNF 14 is placed in the wireless network 10, there are several possible locations for it within the wireless network 10, which will be elaborated on with reference to FIG. 4. When the selection functionality is implemented in the wireless network 15, the selection functionality is referred to as CNF 14, the CNF 14 e.g. being a standalone node in the wireless network or integrated with an existing node of the wireless network. When the selection functionality is implemented in a node of the capillary network 10 it is simply referred to as selection functionality.

Figure 3:
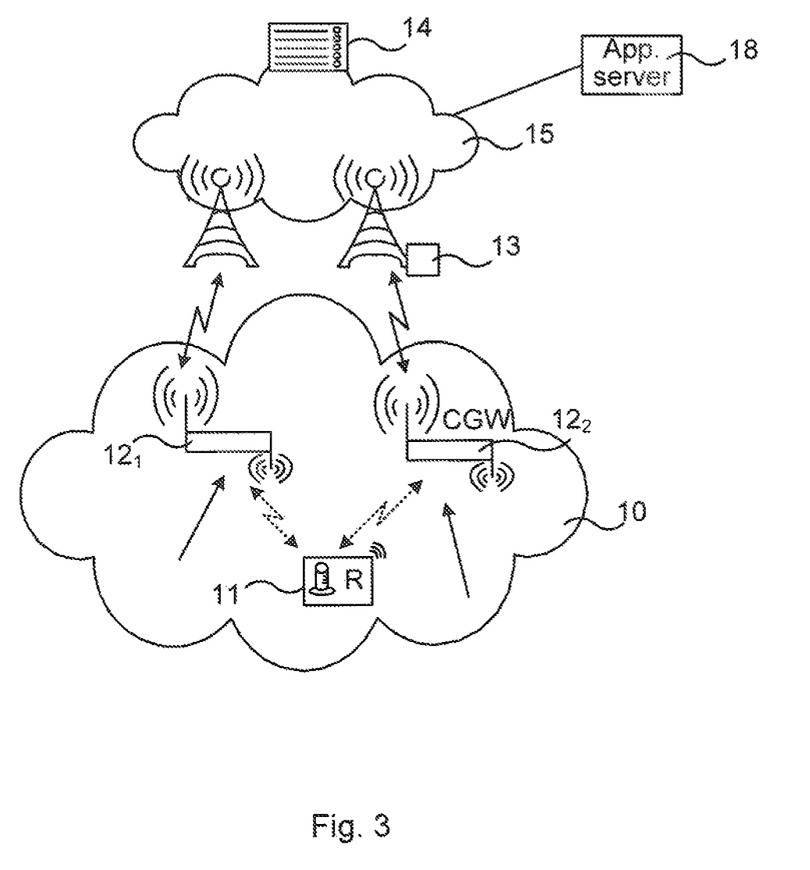

FIG. 3 illustrates an environment in which embodiments of the present disclosure may be implemented. FIG. 3 is similar to FIG. 2, but simplified in that only one MD 11 is illustrated and in that it is a single-hop capillary network 10.

As mentioned earlier, control mechanisms for selecting one out of several CGWs $12_1$, $12_2$ that are available to an MD 11 is an area in which solutions are lacking. The current mechanism is typically that the MD 11 uses some kind of channel quality measure/link metric as the basis for the choice of CGW $12_1$, $12_2$, but there are situations in which other mechanisms are desirable. For example, the various MDs 11 of the capillary network 10 may have different requirements, e.g. different energy resources.

In an aspect of the present disclosure, a CGW $12_1$, $12_2$ is selected based on its capability to set up a message box, e.g. a proxy message box, for energy-efficient message-oriented communication with an MD 11. The MD 11 can thereby send and receive messages to and from the message box in the CGW $12_1$, $12_2$ during shorter time periods than would be required for communication with a fixed default message box located further away from the MD 11 in an uplink direction from the MD 11, e.g. in the wireless network 15, or in the global Internet. Without a proxy message box in the CGW $12_1$, $12_2$ the communication would be prolonged due to the transfer latency across the wireless network 15, resulting in longer awake periods for the MD 11, which leads to a shorter MD 11 battery life-time.

Mirror functionality in general is the maintenance of multiple copies of data, e.g. for enabling recovery of data at hardware failure. In the present context, the message boxes can be seen as corresponding to such mirror functionality. Alternatively, the message box may be a server that stores messages sent to/from an MD 11, in a fashion similar to an email server. The message box capability of the capillary network gateway may thus be its ability to receive data (often denoted "resources") from the MD and store it, and/or update existing data for the MD.

MDs 11 with strong sleep demands select a CGW $12_1$, $12_2$ having a proxy message box capability for obtaining shorter connectivity time periods.

If an MD 11 with strong battery saving requirements could connect to multiple CGWs $12_1$, $12_2$ and one of them has a proxy message box function, e.g. a Constrained Application Protocol (CoAP) mirror proxy, the MD 11 selects this CGW $12_1$, $12_2$. In other embodiments, there may be further requirements, e.g. the MD 11 selects the CGW $12_1$, $12_2$ with a proxy message box function, provided that other criteria are fulfilled, e.g. provided that connectivity metrics are good enough.

When the MD 11 wakes up, i.e. exits its sleep mode, it only requires a short transaction with the message box of the CGW $12_1$, $12_2$ in order to obtain its messages and/or upload data or messages to the message box (to be conveyed to the application of the application server) and go back to sleep (i.e. enter sleep mode) rather than a more lengthy connectivity procedure with a message box in the backhaul network, i.e. the wireless network 15, which forces the MD 11 to stay active for a longer time.

Even though the MD 11 itself eventually and inevitably is the entity that executes the CGW selection, e.g. in terms of association with a certain CGW, it would be advantageous to allow the wireless network 15 to maintain some level of control or at least influence over the MD's 11 choice. This control may come in the shape of explicit instructions, policies/rules based on contextual input parameters, and/or modification of contextual parameters that may indirectly affect the MD's 11 choice of CGW $12_1$, $12_2$.

The capillary network functionality CNF 14 is a new functionality provided by the present disclosure. The CNF 14 may handle various tasks related to the capillary network 10 and in particular the CGW $12_1$, $12_2$. Such tasks may, depending on where the functionality is implemented, comprise e.g. configuration of the CGWs $12_1$, $12_2$ and the CNF 14 may also to some extent be involved in traffic processing.

The CNF 14, which at least comprises a selection functionality, provides an improved selection of a CGW $12_1$, $12_2$ for the MD 11, in particular addressing the above described aspects of the selection. In the selection of a CGW $12_1$, $12_2$, their capabilities to set up a proxy message box are taken into account.

In order for this proxy message box capability to be considered in the choice of CGW $12_1$, $12_2$, information about this capability of the CGWs $12_1$, $12_2$, has to be gathered. In short, in order to provide input to the CNF 14 making the CGW selection this information needs to be obtained. The wireless network 15 may exercise its control over the CGW selection either directly as explicit instructions or indirectly using configurable rules and/or policies and/or by modifying contextual parameters that may indirectly affect the MD's 11 choice of CGW. Depending on how and by which entity the selection decision is made (i.e. where the method is implemented) and the way the wireless network 15 exercises its control over the MD's CGW choice, the information gathering may be performed in different ways and by different entities, which will be described in the following.

First, embodiments are described wherein the wireless network 15 exercises its control through explicit instructions regarding the selection. In these embodiments thus, the wireless network 15 exercises its control over the MD's choice of CGW $12_1$, $12_2$ through explicit instructions to the MD 11 to select a certain CGW $12_1$, $12_2$. The instructions may be provided in different ways, e.g. as an instruction to the MD 11 to connect/associate with another CGW than the currently used CGW. The instruction may e.g. be sent to the MD 11 by the MD's 11 current CGW or by the CNF 14. In the latter case, the instruction, e.g. a message containing the instruction, traverses the CGW $12_1$, $12_2$, but it is addressed directly to the MD 11 and is opaque to the CGW $12_1$, $12_2$.

In one embodiment, the CGWs $12_1$, $12_2$ exchange information about their respective message box capabilities, directly across the capillary network 10, i.e. over the air interface (e.g. Bluetooth) used within the capillary network 10. The CGWs $12_1$, $12_2$ thus communicate their respective message box capability to one another, i.e. a particular CGW sends its message box capability information to all other CGWs and, correspondingly receives, from all the other CGWs their respective message box capability information.

In this embodiment, the selection functionality may be implemented in each CGW $12_1$, $12_2$ so that each CGW $12_1$, $12_2$ is able to perform the selection. In particular, each CGW $12_1$, $12_2$ will come to the same result about which CGW $12_1$, $12_2$ to select for a particular MD 11. This result may be then, as mentioned, be provided to the MD 11 as an explicit instruction to select (and eventually connect to) the CGW $12_1$, $12_2$ that results from the selection procedure. The explicit instruction may be sent by its current CGW, if the MD 11 already has a selected CGW, or by any CGW $12_1$, $12_2$ in the capillary network 10 if the MD 11 has no current GGW, e.g. the one that has been selected for use by the MD 11. Thus, the CGW $12_1$, $12_2$ to which the MD 11 is currently connected or associated with may send an instruction to the MD 11 to connect/associate with a certain alternative CGW (provided that it is not determined that the MD should remain with the current CGW). The CGW $12_1$, $12_2$ may send such an instruction in the form of a field in a RPL message, as a link layer (management) message or as a parameter in a unicast IPv6 router advertisement. Other possibilities comprise sending the instruction in e.g. a CoAP message or an Open Mobile Alliance Lightweight Machine to Machine (OMA-LWM2M) message.

In another embodiment, each CGW $12_1$, $12_2$ sends its respective message box capability information to a CNF 14 located in the wireless network 15. The CNF 14 in turn distributes the information to the other CGWs $12_1$, $12_2$ being part of the same capillary network 10, which may, as in the above embodiment, also comprise the selection functionality. The CNF 14 may be implemented as an entity in the wireless network 15, e.g. implemented integrated in an existing node of the wireless network 15 or as a standalone node in the wireless network 15. In some embodiments the CNF 14 may perform the selection based on the information received from the CGWs $12_1$, $12_2$ and then send, via a CGW of the capillary network 10, explicit instruction to the MD 11 to select (and eventually connect to) the CGW $12_1$, $12_2$ resulting from the selection. The CNF 14 may alternatively send such instruction directly to the MD 11.

In the latter case, again, the message containing the instruction traverses the CGW $12_1$, $12_2$, but it is addressed directly to the MD 11 and is opaque to the CGW $12_1$, $12_2$.

Alternatively, the CNF 14 located in the wireless network 15, may be inherently aware of the message box capability that is available to the different CGWs $12_1$, $12_2$, e.g. because the CNF 14 may have configured or instructed the CGWs $12_1$, $12_2$ to establish this capability, and is thereby able distribute this message box capability information to the CGWs $12_1$, $12_2$ of the same capillary network 10. Either way, the result of this information exchange/distribution is that all the CGWs $12_1$, $12_2$ connected to the same capillary network 10 will, again, be aware of the message box capabilities at all the other CGWs $12_1$, $12_2$ and hence, in this embodiment, any of the CGWs $12_1$, $12_2$ provided with the selection functionality is thereby able to determine which CGW the MD 11 should select, and connect/associate with.

In the selection procedure, the selection making entity, whether it is implemented in a node of the wireless network 15 or in a CGW $12_1$, $12_2$, information about the MD 11 and/or the application the MD is running may also be taken into account. The selection making entity (e.g. the CNF 14 or CGW $12_1$, $12_2$) may e.g. derive such information from observing and sniffing traffic to/from the MD 11 or from explicit information received from the MD 11.

In another embodiment, the MD 11 has a relation with the CNF 14, or at least the MD 11 is visible and reachable from the CNF 14, which is implemented in the wireless network 15 or in a CGW $12_1$, $12_2$ in the capillary network 10. In this embodiment, the CNF 14 either gathers the message box capability information from the CGWs $12_1$, $12_2$ or is inherently aware of it, as described above. Based on this information and possibly information about the MD 11 and the application it is running, the CNF 14 determines whether a MD 11 should change to another CGW and, if so, sends an explicit instruction directly to the MD 11 to select another CGW, or via a CGW if the CNF 14 is implemented in the wireless network 14. The CNF 14 may acquire information about the MD 11 and/or its application from the MD 11 or the application server 18 comprising a corresponding application or by observing and sniffing the MD's traffic (provided that all the MD's user data traffic passes through the CNF 14).

In a variation of this embodiment, the CNF 14 may, when implemented in the wireless network 15, send the instruction to the MD's current CGW instead of directly to the MD, requesting the current CGW to send an instruction to the MD.

Irrespective of where the selection functionality is implemented, i.e. in the CGW, as a standalone CNF node in the capillary network 10, as a standalone node in the wireless network 15 or integrated with another entity or in the MD, the selection functionality entity making the CGW selection decision on behalf of an MD 11 may, depending on the scenario, have to be provided with information about the CGWs $12_1$, $12_2$ that are currently reachable by the MD 11 and possibly also other contextual parameters such as the MD's 11 channel quality to different CGWs.

Alternatively, the MD 11 may be configured to obey a received CGW selection instruction only if the CGW $12_1$, $12_2$ it is directed to is available to the MD 11 (or reachable with a reasonable channel quality).

Yet another alternative is that the instruction has the form of a number of CGWs $12_1$, $12_2$ listed in priority order, so that if the first CGW in the list is unavailable, or has too poor channel quality, the next CGW in the list is selected for the MD 11, and so on. The CGWs not having any message box capability may be selected for MDs that are less energy constrained or not energy constrained at all, and which may as well communicate their data to a default message box located in the wireless network 15.

Next, embodiments are described wherein the wireless network 15 exercises its control over the MD's choice of CGW $12_1$, $12_2$ indirectly through policies and/or rules and contextual parameters. The selection functionality may thus be implemented in the MD 11, which is configurable with these policies/rules so that it selects a CGW based e.g. on the message box capability thereof while obeying the policies/rules.

These policies/rules may be configured in the MD 11 by a node in the wireless network 15, e.g. an Operation and Maintenance (O&M) entity, or via a CNF 14 that is provided in the wireless network 15. If the O&M entity or CNF 14 does not have a direct relation to the MD 11, the configuration data may be sent first to the CGW $12_1$, $12_2$ to be forwarded to the MD 11. In this case one option is that all MDs 11 in the capillary network 10 are configured with the same policies/rules. However, individually adapted policies/rules are preferable in most cases in order to allow different kinds of MDs 11 and/or applications in the same capillary network 10. One way to achieve individual policy/rule adaptation without sending individual policies/rules to the various different MDs 11, thus causing much data to be sent, is to take the type of MD 11 and/or application into account in the policies/rules, i.e. making the type of MD and/or application a contextual parameter to be part of the input data to the policies/rules.

As implied above, the policies/rules may take contextual parameters as input data to an algorithm that outputs a CGW selection. The input data comprises the available CGWs $12_1$, $12_2$, information reflecting their respective message box capabilities, wherein a CGW may be available to one MD 11 but not to another within the same capillary network 10. The input data may also comprise contextual parameters including other aspects, such as channel quality, required transmission power, battery/energy status, location or capillary network technology used by the various CGWs $12_1$, $12_2$. For instance, a policy/rule may be formulated such that the MD 11 should switch to a certain CGW $12_1$, $12_2$ with a message box capability, but only if the channel quality is good enough. If the battery/energy status of the MD 11 is poor the policy/rule may state that any change of CGW $12_1$, $12_2$ is subject to the required transmission power, e.g. the policy/rule is not allowing increased required transmission power to be used. One or more such contextual parameters, combined in different ways, may be taken into account when making the selection.

In the various embodiments described, information about the message box capability of each CGW $12_1$, $12_2$ may be sent from the CGW $12_1$, $12_2$ to the MD 11 in the form of a field in a RPL message, as a link layer message, e.g. a field in a beacon message, or as a parameter in a broadcast or unicast IPv6 router advertisement. This information may comprise explicit descriptions of the message box capability associated with each CGW, but it may alternatively comprise information in more condensed forms, e.g. as a preference value. In this context "preference value" is intended as a generic designation for a parameter, the purpose of which is to reflect how "attractive" a CGW should be considered in a CGW selection procedure. The preference value should in some sense summarize one or more or all relevant properties/capabilities of the CGW, comprising at least the message box capability and possibly also other properties and even more dynamic properties like the current load of each CGW.

Each CGW $12_1$, $12_2$ may create the message box capability information and/or derivatives thereof independently of the other CGWs $12_1$, $12_2$, including setting of a possible preference value. However, an alternative is that the CGWs $12_1$, $12_2$ are made aware of each other's message box capability, in any of the manners described above, and derives message box capability information and/or derivatives thereof to be sent to the MD(s) 11, e.g. preference values, in a process where the message box capability of all CGWs $12_1$, $12_2$ are taken into account, e.g. to derive relative preference values. In variations, the CNF 14 functionality provided in the wireless network 15 provides the CGWs $12_1$, $12_2$ with the condensed message box capability information, e.g. preference values, which they should deliver to the MDs 11, upon which the selection functionality in the MDs 11 receives this capability information and performs the CGW selection. Yet another option is that the CNF entity 14 in the wireless network 15 sends the information directly to the MDs 11.

Selection based on information about a proxy message box capability of a CGW $12_1$, $12_2$ can be based on the mechanisms described above. In addition, a specific information element describing this capability is needed. This information element can be carried using one of the mechanisms described above, e.g. in an RPL message, or in a broadcast or unicast IPv6 router advertisement.

Figure 4:
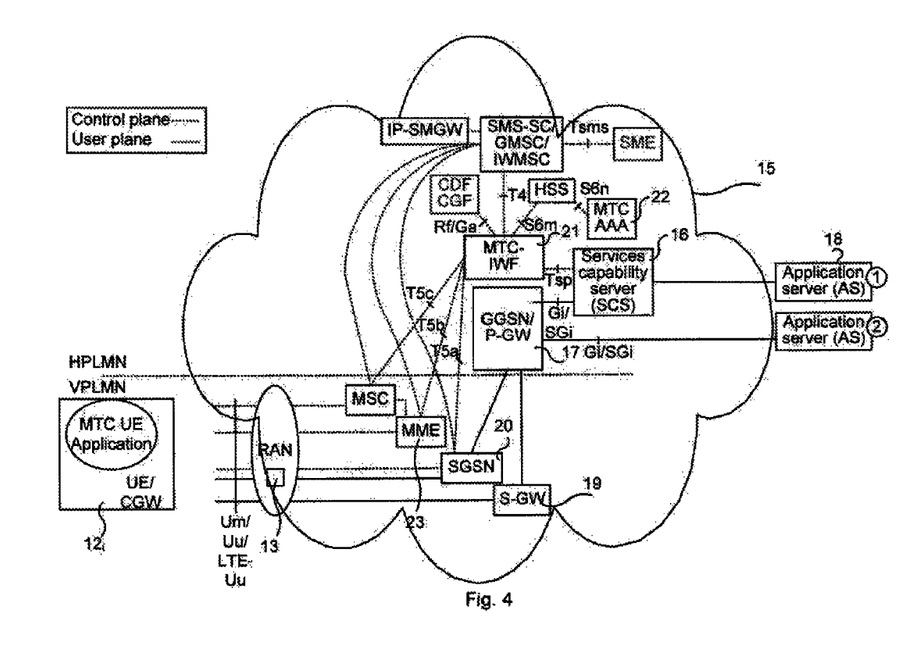
FIG. 4 illustrates a wireless network in which embodiments of the present disclosure may be implemented.

In the embodiments where the CNF 14, implemented in the wireless network 15, has to know the message box capability of the CGWs $12_1$, $12_2$, the CNF 14 may, partly depending on deployment scenario, receive this information from the CGW $12_1$, $12_2$, the O&M system, a Packet Data Network Gateway (PGW) 17, a Mobility Management Entity (MME) 23 or it may know this inherently (also refer to FIG. 4 and related description). Inherent awareness and information retrieval from the CGWs have been described earlier. The O&M system, e.g. a MD/CGW/capillary network specific O&M entity, may be aware of the CGWs' $12_1$, $12_2$ message box capability, e.g. by retrieving this information from the CGWs $12_1$, $12_2$ or by being the source of configuration of the CGWs, such that it inherently knows the message box capability of the CGWs. In either case, the O&M entity may inform the CNF 14. The CNF 14 may also have an interface towards the PGW 17 or the MME 23 and retrieve the information from either of these nodes, or any other node having knowledge about the message box capabilities of the CGWs. The MME 23 is a particularly interesting alternative if the CNF 14 is integrated in a Services Capability Server (SCS) 16, in which case the Tsp interface (between the SCS 16 and a Machine Type Communication Inter Working Function, MTC-IWF, node 21) and the T5b interface (between the MTC-IWF 21 and the MME 23) may be used (again, also refer to FIG. 4).

FIG. 4 illustrates a wireless network in which embodiments of the present disclosure may be implemented, and in particular a schematic overview of an exemplifying wireless network 15 in which embodiments of the present disclosure can be implemented. The wireless network 15 illustrated in FIG. 4 is an LTE based network. It is noted that the terms "LTE" and "LTE based" system is here used such as to encompass both present and future LTE based systems, such as, for example, advanced LTE systems. It should be appreciated, and as mentioned earlier, that although FIG. 4 illustrates a wireless network 15 in the form of an LTE based system, the example embodiments described herein may also be utilized in connection with other wireless communication systems, such as e.g. GSM or UMTS, comprising nodes and functions that correspond to the nodes and functions of the wireless network 15 in FIG. 4.

The wireless network 15 comprises one or more base stations in the form of eNodeBs 13, operatively connected to a Serving Gateway (SGW) 19, in turn operatively connected to a Packet Data Network Gateway (PGW)/Gateway General Packet Service Support Node (GGSN) 17. It is noted that the P-GW and GGSN may alternatively be separate nodes. The SGW 19 routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). Among other things, the SGW manages and stores UE contexts (the CGW is acting as a UE towards the wireless network 15), e.g. parameters of the Internet Protocol (IP) bearer service, and network internal routing information. Further, the wireless network 15 may comprise a Serving General Packet Service Support Node (SGSN) 20, a Services Capability Server (SCS) 16, a Machine Type Communication Inter Working Function (MTC-IWF) node 21, and a MTC Authentication, Authorization and Accounting (AAA) node 22.

The PGW 17 provides connectivity for the CGW to external packet data networks (PDNs, not explicitly illustrated, but the application server 18 may be part of such PDN) by being the point of exit and entry of traffic for the CGW. A CGW may have simultaneous connectivity with more than one PGW for accessing multiple PDNs. The PGW 17 performs policy enforcement, packet filtering for each user, charging support, lawful Interception and packet screening. Another key role of the PGW 17 is to act as the anchor for mobility between 3GPP and non-3GPP technologies such as WiMAX and 3GPP2 (CDMA 1X and EvDO). The interface between the PGW 17 and the packet data network, being for instance the Internet, is referred to as the SGi. The packet data network may be an operator external public or private packet data network or an intra operator packet data network, e.g. for provision IP Multimedia Subsystem (IMS) services.

For the case that the CNF 14 is implemented in the wireless network 15 (being an LTE network) it preferably resides above the SGi interface and is further assumed to be reachable from the CGW $12_1$, $12_2$ via the user plane (user plane indicated in the FIG. 4 by solid lines). The CNF 14 may also have one or more interfaces to one or more O&M entities, e.g. O&M entities dedicated for CGWs, MDs and/or capillary networks 10.

Embodiments of the present disclosure may for example be implemented in the SGW 19, the GGSN/PGW 17 or the eNodeB 13, the SGSN 20, the SCS 16, a Radio Network Controller (RNC), or a NodeB in a Universal Mobile Telecommunication System, UMTS, network, or an SGSN 20, a GGSN, a Base Station Controller (BSC), or a Base Transceiver Station (BTS) in a Global System for Mobile communications (GSM) network. The CNF 14 may be implemented in the SCS 16, the MTC-IWF 21 node or the MTC AAA node 22. The CNF 14 may thus be located with any of the mentioned nodes or yet others, i.e. integrated with the node or as a part of the node. In other embodiments, the CNF 14 is deployed as a separate entity.

Above, only exemplary nodes wherein embodiments of the present disclosure may be implemented are provided. As is well known, the wireless network 15 comprises a number of additional nodes, such as Mobility Management Entity (MME) 23, involved in various task, for example in the bearer activation/deactivation process and is also responsible for choosing the SGW 19 for a CGW at the initial attach and at time of intra-LTE handover involving core network node relocation. Such additional nodes are illustrated in FIG. 4, but not described further herein. In the following, a node of the wireless network 15 is collectively referred to by reference numeral 30, and may thus comprise any one of the mentioned nodes or corresponding nodes of other communication systems.

Figure 5:
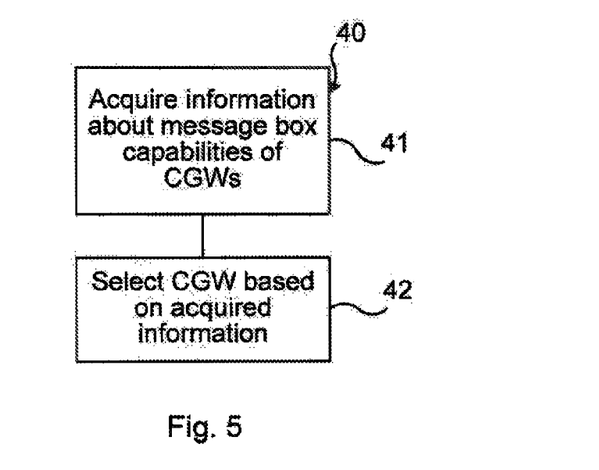
FIG. 5 illustrates a flow chart over steps of a method in a network node in accordance with the present disclosure.

FIG. 5 illustrates a flow chart over steps of a method 40 in a node in accordance with the present disclosure. The method 40 is for selecting a capillary network gateway $12_1$, $12_2$ for a machine device 11 of a capillary network 10. The capillary network gateway $12_1$, $12_2$ is capable of data exchange between the machine device 11 and the wireless network 15. The capillary network gateway $12_1$, $12_2$ may be capable of the data exchange by being provided with a first interface enabling communication with the machine device 11 and with a second interface enabling communication with the wireless network 15. For example, the first interface may comprise a protocol stack relevant for the radio access technology used in the capillary network 10, and correspondingly, the second interface may comprise a protocol stack relevant for the radio access technology used in the wireless network 15.

The method 40 comprises acquiring 41 information about a respective message box capability for two or more capillary network gateways $12_1$, $12_2$ of the capillary network 10. The acquiring of information may be done in different ways, as has been described. A node in which the method 40 is performed may for example be inherently aware of such information, or it may receive or retrieve such information from another node.

The method 40 comprises selecting 42, for the machine device 11, the capillary network gateway $12_1$, $12_2$ based on the information about the message box capability. The information about the message box capability may comprise e.g. a binary value stating either "message box capability" or "no message box capability". The information about the message box capability may in other instances comprise the type of message box, e.g. a message box storing messages (e.g. similar to an e-mail server) or a message box mirroring data objects (e.g. similar to a mirror server). Such information represents two different capabilities, which may thus comprise the information about the message box capability. In addition, the information about the message box capability may comprise the type of communication protocol required by the message box (e.g. CoAP or HTTP). Also, the information about the message box capability may comprise an authentication method required by the message box.

The information about the message box capability may thus comprise various pieces of information, combined in different ways.

If none of the available capillary network gateways comprise such message box capability, then the capillary network gateway $12_1$, $12_2$ best meeting an additional criterion may instead be chosen, wherein the additional criterion for example may be the channel quality, and the machine device 11 may then be configured to use a default message box, provided in the wireless network 15.

In an embodiment, the selecting 42 is further based on a characteristic of an energy supply of the machine device 11, and wherein the selecting 42 comprises selecting, for a machine device 11 having a constrained energy supply, a capillary network gateway $12_1$, $12_2$ having a message box capability. That is, the need of the machine device 11 to select a capillary network gateway having a message box may be related to its energy supply, e.g. a highly energy constrained machine device 11 has a correspondingly high need to be in a low-power mode (also denoted sleep mode) and thereby selects (and eventually connects to) the capillary network gateway having message box capability. For a machine device 11 having a pertaining need to be in the low-power mode (i.e. needs to conserve energy owing to it having a constrained energy supply), a capillary network gateway $12_1$, $12_2$ having a message box capability is thus selected.

In an embodiment, the information about the message box capability is conveyed by an information element of a data packet exchanged between the machine device 11 and the wireless network 15.

In an embodiment, the selecting 42 is further based on one or more additional criteria chosen from: a requirement of an application configured in the machine device 11, channel quality and/or required transmission power of a channel between the machine device 11 and each of the two or more capillary network gateways $12_1$, $12_2$, energy status of the machine device 11, location of the two or more capillary network gateways $12_1$, $12_2$, radio technology used by the respective capillary network gateway $12_1$, $12_2$ in communication with the machine device 11, latency between the machine device 11 and each of the at least two capillary network gateway $12_1$, $12_2$.

In an embodiment, the method 40 is performed when the machine device 11 exits a low-power mode. The method 40 may for example be performed each time the machine device "wakes up" to perform a certain task.

In an embodiment, the method 40 comprises connecting the machine device 11 to the selected capillary network gateway $12_1$, $12_2$.

In a variation of the above embodiment, the selecting is further based on an additional criterion and the connecting comprises connecting the machine device 11 to the capillary network gateway $12_1$, $12_2$ when the additional criterion is met and the selected capillary network gateway $12_1$, $12_2$ has a message box capability, and else connecting the machine device 11 to another capillary network gateway $12_1$, $12_2$ meeting the additional criterion and the other capillary network gateway $12_1$, $12_2$ having a message box capability. As a particular example, the additional criterion to meet may be that a certain channel quality to the capillary network gateway has to be met. The machine device is then connected to the selected capillary network gateway $12_1$, $12_2$ having a message box capability if the channel quality is good enough (i.e. meets the channel quality requirement), while another capillary network gateway $12_1$, $12_2$ also having a message box capability is instead selected if the machine device 11 has a better channel quality towards this capillary network gateway.

In an embodiment, the selecting is further based on requirements of an application run by the machine device 12. The method 40 comprises deriving information about the application run by the machine device 11 by parsing an incoming or outgoing machine device 11 message or by acquiring information about the application run by the machine device 11 from a node within the capillary network 10 or from a node within the wireless network 15 or from a node that is external both to the wireless network 15 and the capillary network 10.

In an embodiment, the method 40 is performed in a capillary network gateway $12_1$, $12_2$.

In a variation of the above embodiment, the acquiring 41 comprises receiving information about a message box capability from at least one other capillary network gateway $12_2$ of the capillary network 10 or from a network node 14, 30 of the wireless network 15.

In an embodiment, the method 40 is performed in a network node 14, 30 of the wireless network 15.

In a variation of the above embodiment, the acquiring 41 comprises obtaining, in the network node 14, 30, information about a respective message box capability for two or more capillary network gateways $12_1$, $12_2$.

In a variation of the above two embodiments, the obtaining comprises: receiving, from each of the two or more capillary network gateways $12_1$, $12_2$ information about a respective message box capability; or using information about the respective message box capability available in the network node 14, 30; or receiving, from one or more other network nodes 14, 30 of the wireless network 15, information about a respective message box capability for the two or more capillary network gateways $12_1$, $12_2$.

In an embodiment, the method 40 is performed in a machine device 11.

In a variation of the above embodiment, the acquiring 41 comprises receiving information about a respective message box capability from two or more capillary network gateways $12_1$, $12_2$.

In an embodiment, the message box provides a data mirroring service.

In an embodiment, the selecting 42 is based on the information about the message box capability and an additional criterion, and wherein the selecting comprises, when the two or more capillary network gateways $12_1$, $12_2$ has the same message box capability, selecting the capillary network gateway $12_1$, $12_2$ best meeting the additional criterion.

Figure 6:
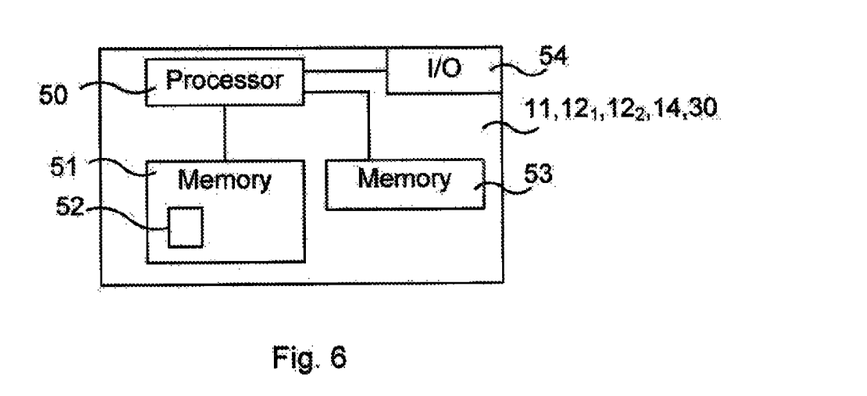
FIG. 6 illustrates schematically a node and means for implementing methods of the present disclosure.

FIG. 6 illustrates schematically a node 11; $12_1$, $12_2$; 14; 30 and means for implementing methods of the present disclosure. The node 11; $12_1$, $12_2$; 14; 30 comprises a processor 50 comprising any combination of one or more of a central processing unit (CPU), multiprocessor, microcontroller, digital signal processor (DSP), application specific integrated circuit etc. capable of executing software instructions stored in a memory 51, which can thus be a computer program product 51. The processor 50 can be configured to execute any of the various embodiments of the method as described, e.g. in relation to FIG. 5, or generally any of the functions as has been described.

The memory 51 can be any combination of read and write memory (RAM) and read only memory (ROM). The memory 51 also comprises persistent storage, which, for example, can be any single one or combination of magnetic memory, optical memory, solid state memory or even remotely mounted memory.

The node 11; $12_1$, $12_2$; 14; 30 may further comprise a data memory 53 for reading and/or storing data during execution of software instructions in the processor 50. The data memory 53 can be any combination of read and write memory (RAM) and read only memory (ROM).

The node 11; $12_1$, $12_2$; 14; 30 further comprises one or more input/output (I/O) devices 54 (only one illustrated) for communicating with other entities within the capillary network 10 and/or within the wireless network 15. For example, when the node comprises the CGW $12_1$, $12_2$, then the I/O 54 may comprise a first interface device for communication with the MDs 11 (e.g. a Bluetooth interface) and a second interface device for communication with the wireless network 15, and in particular an access node thereof, e.g. eNB 13, the second interface may thus comprise an LTE interface.

Depending on type of node, it may comprise still further means and devices, e.g. antenna circuitry if the node is an MD 11 or CGW $12_1$, $12_2$ or an access node (e.g. eNB 13).

Thus, the present disclosure provides a node 11, $12_1$, $12_2$; 14, 30 for selecting a capillary network gateway $12_1$, $12_2$ for a machine device 11 of a capillary network 10. The capillary network gateway $12_1$, $12_2$ is capable of data exchange between the machine device 11 and the wireless network 15. The node 11, $12_1$, $12_2$; 14, 30 comprises a processor 50 and memory 51, the memory 51 containing instructions executable by the processor 50, whereby the node 11, $12_1$, $12_2$; 14, 30 is operative to:

acquire information about a respective message box capability for two or more capillary network gateways $12_1$, $12_2$ of the capillary network 10, and select, for the machine device 11, the capillary network gateway $12_1$, $12_2$ based on the information about message box capability.

In an embodiment, the node 11, $12_1$, $12_2$; 14, 30 is configured to select further based on a characteristic of an energy supply of the machine device 11, and configured to select, for a machine device 11 having a constrained energy supply, a capillary network gateway 12$_1$, 12$_2$ having a message box capability.

In an embodiment, the node 11, 12$_1$, 12$_2$; 14, 30 is configured to convey the information about the message box capability by using an information element of a data packet exchanged between the machine device 11 and the wireless network 15.

In an embodiment, the node 11, 12$_1$, 12$_2$; 14, 30 is configured to select further based on one or more additional criteria chosen from: a requirement of an application configured in the machine device 11, channel quality and/or required transmission power of a channel between the machine device 11 and each of the two or more capillary network gateways 12$_1$, 12$_2$, energy status of the machine device 1, location of the two or more capillary network gateways 12$_1$, 12$_2$, radio technology used by the respective capillary network gateway 12$_1$, 12$_2$ in communication with the machine device 11, latency between the machine device 11 and each of the at least two capillary network gateway 12$_1$, 12$_2$.

In an embodiment, the node 11, 12$_1$, 12$_2$; 14, 30 is configured to perform the acquiring and selecting when the machine device 11 exits a low-power mode.

In an embodiment, the node 11, 12$_1$, 12$_2$; 14, 30 is configured to connect the machine device 11 to the selected capillary network gateway 12$_1$, 12$_2$.

In a variation of the above embodiment, the node 11, 12$_1$, 12$_2$; 14, 30 is configured to select further based on an additional criterion and configured to connect the machine device 11 to the capillary network gateway 12$_1$, 12$_2$ when the additional criterion is met and the selected capillary network gateway 12$_1$, 12$_2$ has a message box capability, and else connect the machine device 11 to another capillary network gateway 12$_1$, 12$_2$ meeting the additional criterion and the other capillary network gateway 12$_1$, 12$_2$ having a message box capability.

In an embodiment, the node 11, 12$_1$, 12$_2$; 14, 30 is configured to select further based on requirements of an application run by the machine device 12, the node further being configured to derive information about the application run by the machine device 11 by parsing an incoming or outgoing machine device 11 message or configured to acquire information about the application run by the machine device 11 from a node within the capillary network 10 or from a node within the wireless network 15 or from a node external to the wireless network 15 and the capillary network 10.

In an embodiment, the node 11, 12$_1$, 12$_2$; 14, 30 comprises a capillary network gateway 12$_1$.

In a variation of the above embodiment, the node 11, 12$_1$, 12$_2$; 14, 30 is configured to acquire by receiving information about a message box capability from at least one other capillary network gateway 12$_2$ of the capillary network 10 or from a network node 14, 30 of the wireless network 15.

In an embodiment, the node 11, 12$_1$, 12$_2$; 14, 30 comprises a network node 14, 30 of the wireless network 15. Examples of such network nodes have been given earlier, e.g. being the SCS 16, CNF 14, the radio access node 13 etc.

In a variation of the above embodiment, the node 11, 12$_1$, 12$_2$; 14, 30 is configured to acquire by obtaining, in the network node 14, 30, information about a respective message box capability for two or more capillary network gateways 12$_1$, 12$_2$.

In a variation of the above embodiment, the node 11, 12$_1$, 12$_2$; 14, 30 is configured to obtain by:

receiving, from each of the two or more capillary network gateways 12$_1$, 12$_2$ information about a respective message box capability, or using information about the respective message box capability available in the network node 14, 30, or receiving, from one or more other network nodes 14, 30 of the wireless network 15, information about a respective message box capability for the two or more capillary network gateways 12$_1$, 12$_2$.

In an embodiment, the node 11, 12$_1$, 12$_2$; 14, 30 comprises a machine device 11.

In a variation of the above embodiment, the node 11 is configured to acquire by receiving information about a respective message box capability from two or more capillary network gateways 12$_1$, 12$_2$.

In various embodiments, the message box comprises a proxy message box configured to provide a data mirroring service. In various other embodiments, the message box comprises a storing service for messages.

In an embodiment, the node 11, 12$_1$, 12$_2$; 14, 30 is configured to select based on the information about the message box capability and an additional criterion, and configured to select, when the two or more capillary network gateways 12$_1$, 12$_2$ has the same message box capability, the capillary network gateway 12$_1$, 12$_2$ best meeting the additional criterion.

The present disclosure further provides a computer program 52 for a node 12$_1$, 12$_2$; 14, 30 for selecting a capillary network gateway 12$_1$, 12$_2$ for a machine device 11 of a capillary network 10. The capillary network gateway 12$_1$, 12$_2$ is capable of data exchange between the machine device 11 and the wireless network 15. The computer program 52 comprises computer program code, which, when run on the node 11, 12$_1$, 12$_2$; 14, 30 causes the node 11, 12$_1$, 12$_2$; 14, 30 to:

acquire information about a respective message box capability for two or more capillary network gateways 12$_1$, 12$_2$ of the capillary network 10, and select, for the machine device 11, the capillary network gateway 12$_1$, 12$_2$ based on the information about the message box capability.

The present disclosure further encompasses the earlier mentioned computer program product 51 comprising the computer program 52 as above, and a computer readable means on which the computer program 52 is stored.

The computer program product 51, or the memory, thus comprises instructions executable by the processor. Such instructions may be comprised in a computer program, or in one or more software modules or function modules.

Figure 7:
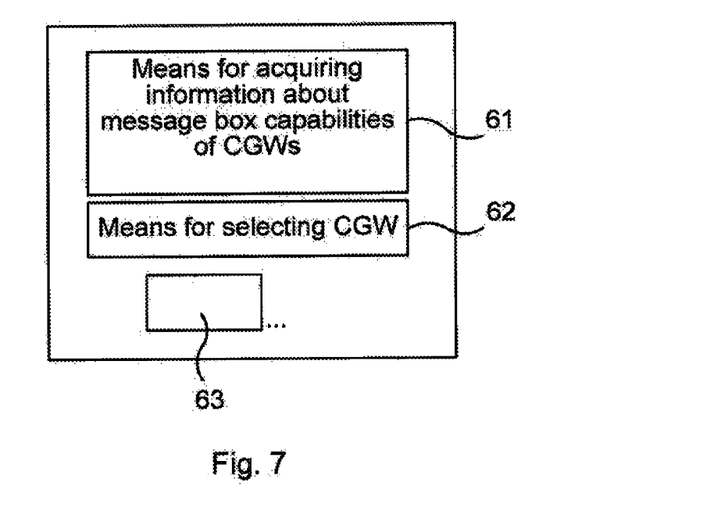
FIG. 7 illustrates a network node comprising functions modules/software modules for implementing methods of the present disclosure.

An example of an implementation using function modules and/or software modules is illustrated in FIG. 7, in particular illustrating a node comprising such means for implementing embodiments of the described method. FIG. 7 thus illustrates a node for selecting a capillary network gateway 12$_1$, 12$_2$ for a machine device 11 of a capillary network 10, wherein the capillary network gateway 12$_1$, 12$_2$ is capable of data exchange between the machine device 11 and the wireless network 15. The node 11; 12$_1$, 12$_2$; 14; 30 comprises first means 61 for acquiring information about a respective message box capability for two or more capillary network gateways 12$_1$, 12$_2$ of the capillary network 10. The node 11; 12$_1$, 12$_2$; 14; 30 comprises second means 62 for selecting, for the machine device 11, the capillary network gateway 12$_1$, 12$_2$ based on the information about the message box capability.

The first and second means 61, 62, e.g. functional modules, can be implemented using software instructions such as computer program executing in a processor and/or using hardware, such as application specific integrated circuits, field programmable gate arrays, discrete logical components etc.

The node 11; $12_1$, $12_2$; 14; 30 may comprise still further such means for implementing any of the embodiments of the method as has been described. For example, third means 63 may be provided for selecting by further basing the selection on information relating to the machine device 11. As another example, the node may comprise means for selecting further based on a characteristic of an energy supply of the machine device 11, and means for selecting, for a machine device 11 having a constrained energy supply, a capillary network gateway $12_1$, $12_2$ having a message box capability.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for selecting a capillary network gateway for a machine device of a capillary network, the capillary network gateway being capable of data exchange between the machine device and a wireless network, the method comprising:
   acquiring information about a respective message box capability for two or more capillary network gateways of the capillary network, and
   selecting, for the machine device, the capillary network gateway based on the information about the message box capability.

2. The method as claimed in claim 1, wherein the selecting is further based on a characteristic of an energy supply of the machine device, and wherein the selecting comprises selecting, for a machine device having a constrained energy supply, a capillary network gateway having a message box capability.

3. The method as claimed in claim 1, wherein acquiring the information about a respective message box capability for two or more capillary network gateways of the capillary network comprises acquiring the information from an information element of a data packet exchanged between the machine device and the wireless network.

4. The method as claimed in claim 1, wherein the selecting is further based on one or more additional criteria chosen from: a requirement of an application configured in the machine device, channel quality and/or required transmission power of a channel between the machine device and each of the two or more capillary network gateways, energy status of the machine device, location of the two or more capillary network gateways, radio technology used by the respective capillary network gateway in communication with the machine device, latency between the machine device and each of the at least two capillary network gateway.

5. The method as claimed in claim 1, comprising connecting the machine device to the selected capillary network gateway.

6. The method as claimed in claim 5, wherein the selecting is further based on an additional criterion and wherein the connecting comprises connecting the machine device to the capillary network gateway when the additional criterion is met and the selected capillary network gateway has a message box capability, and else connecting the machine device to another capillary network gateway meeting the additional criterion and the other capillary network gateway having a message box capability.

7. The method as claimed in claim 1, wherein the selecting is further based on requirements of an application run by the machine device, the method comprising deriving information about the application run by the machine device by parsing an incoming or outgoing machine device message or by acquiring information about the application run by the machine device from a node within the capillary network or a node within the wireless network or a node external to the wireless network and the capillary network.

8. The method as claimed in claim 1, wherein acquiring the information about a respective message box capability for two or more capillary network gateways of the capillary network comprises receiving, at a first capillary network gateway of the capillary network, information about a message box capability from at least one other capillary network gateway of the capillary network or from a network node of the wireless network.

9. The method as claimed in claim 1, wherein acquiring the information about a respective message box capability for two or more capillary network gateways of the capillary network comprises obtaining, by a network node, information about a respective message box capability for two or more capillary network gateways.

10. The method as claimed in claim 9, wherein the obtaining comprises:
   receiving, from each of the two or more capillary network gateways information about a respective message box capability, or
   using information about the respective message box capability available in the network node, or
   receiving, from one or more other network nodes of the wireless network, information about a respective message box capability for the two or more capillary network gateways.

11. The method as claimed in claim 1, wherein acquiring the information about a respective message box capability for two or more capillary network gateways of the capillary network comprises receiving, at the machine device, information about a respective message box capability from two or more capillary network gateways.

12. A node for selecting a capillary network gateway for a machine device of a capillary network, the capillary network gateway being capable of data exchange between the machine device and a wireless network, the node comprising a processor and memory, the memory containing instructions executable by the processor, whereby the node is operative to:
   acquire information about a respective message box capability for two or more capillary network gateways of the capillary network, and
   select, for the machine device, the capillary network gateway based on the information about message box capability.

13. The node as claimed in claim 12, wherein the node is configured to select further based on a characteristic of an energy supply of the machine device, and wherein the node is further configured to select, for a machine device having a constrained energy supply, a capillary network gateway having a message box capability.

14. The node as claimed in claim 12, wherein the node is configured to convey the information about the message box capability by using an information element of a data packet exchanged between the machine device and the wireless network.

15. The node as claimed in claim 12, wherein the node is configured to select further based on one or more additional criteria chosen from: a requirement of an application configured in the machine device, channel quality and/or required transmission power of a channel between the machine device and each of the two or more capillary network gateways, energy status of the machine device, location of the two or more capillary network gateways, radio technology used by the respective capillary network gateway in communication with the machine device, latency between the machine device and each of the at least two capillary network gateway.

16. The node as claimed in claim 12, wherein the node is configured to perform the acquiring and selecting when the machine device exits a low-power mode.

17. The node as claimed in claim 12, wherein the node is configured to connect the machine device to the selected capillary network gateway.

18. The node as claimed in claim 17, wherein the node is configured to select further based on an additional criterion and wherein the node is further configured to connect the machine device to the capillary network gateway when the additional criterion is met and the selected capillary network gateway has a message box capability, and else connect the machine device to another capillary network gateway meeting the additional criterion and the other capillary network gateway having a message box capability.

19. The node as claimed in claim 12, wherein the node is configured to select further based on requirements of an application run by the machine device, and wherein the node is further configured to derive information about the application run by the machine device by parsing an incoming or outgoing machine device message or wherein the node is configured to acquire information about the application run by the machine device from a node within the capillary network or from a node within the wireless network or from a node external to the wireless network and the capillary network.

20. The node as claimed in claim 12, wherein the node comprises a capillary network gateway that is configured to acquire by receiving information about a message box capability from at least one other capillary network gateway of the capillary network or from a network node of the wireless network.

21. The node as claimed in claim 12, wherein the node comprises a network node of the wireless network that is configured to acquire by obtaining, in the network node, information about a respective message box capability for two or more capillary network gateways.

22. The node as claimed in claim 21, wherein the node is configured to obtain by:
  receiving, from each of the two or more capillary network gateways information about a respective message box capability, or
  using information about the respective message box capability available in the network node, or
  receiving, from one or more other network nodes of the wireless network, information about a respective message box capability for the two or more capillary network gateways.

23. The node as claimed in claim 12, wherein the node comprises a machine device that is configured to acquire by receiving information about a respective message box capability from two or more capillary network gateways.

24. The node as claimed in claim 12, wherein the message box comprises a proxy message box that is configured to provide a data mirroring service and/or a message storing service.

25. The node as claimed in claim 12, wherein the node is configured to select the capillary network gateway based on the information about the message box capability and based also on an additional criterion, and wherein the node is further configured to select, when the two or more capillary network gateways has the same message box capability, the capillary network gateway best meeting the additional criterion.

* * * * *